United States Patent [19]
Maeda et al.

[11] 3,879,336
[45] Apr. 22, 1975

[54] PROCESS FOR PREPARING COLORED SYNTHETIC LEATHER

[75] Inventors: Shigeo Maeda; Minoru Ozutsumi; Isao Niimura; Hideo Okazaki, all of Tokyo, Japan

[73] Assignee: Hodogaya Chemical Co., Ltd., Tokyo, Japan

[22] Filed: Apr. 5, 1974

[21] Appl. No.: 458,191

Related U.S. Application Data

[63] Continuation-in-part of Ser. No. 376,387, July 5, 1973, abandoned.

[30] Foreign Application Priority Data

July 5, 1972  Japan.................... 47-66647
Aug. 17, 1972  Japan.................... 47-81822

[52] U.S. Cl........ 260/37 N; 260/145 A; 260/145 B; 260/146 D; 260/147; 260/149; 260/151
[51] Int. Cl.......................................... C08g 51/66
[58] Field of Search......... 260/147, 149, 151, 37 N, 260/37 ND, 146 D

[56] References Cited
UNITED STATES PATENTS

| | | | |
|---|---|---|---|
| 2,660,574 | 11/1953 | Jones............................ | 260/37 NP |
| 3,086,967 | 4/1963 | Davies........................... | 260/151 |
| 3,137,671 | 6/1964 | Bosshard....................... | 260/37 N |
| 3,391,132 | 7/1968 | Beffa............................. | 260/147 |
| 3,417,073 | 12/1968 | Meininger...................... | 260/147 |
| 3,459,727 | 8/1969 | Steiner.......................... | 260/147 |
| 3,658,747 | 4/1972 | Kolyer........................... | 260/37 N |
| 3,730,950 | 5/1973 | Barnes........................... | 260/37 N |

*Primary Examiner*—Harry Wong, Jr.
*Assistant Examiner*—Paul R. Michl
*Attorney, Agent, or Firm*—Oblon, Fisher, Spivak, McClelland & Maier

[57] ABSTRACT

A colored synthetic polyurethane leather is prepared by reacting a polyisocyanate with a polyol or a polyurethane substrate and a 2 : 1 complex metal dye which contains an isocyanate-reactive group selected from the group consisting of amino, alkylamino, and hydroxyl and which has the formula

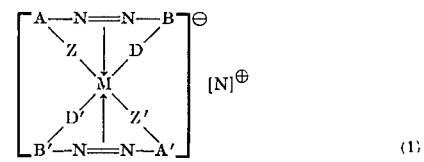

(1)

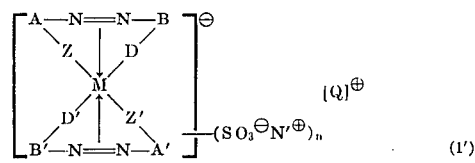

(1')

wherein A and A' are the same or different and each represent phenylene which can have non-dissociated substituents; B and B' are the same or different and each represent coupling components which can contain nondissociated substituents within each component and are disposed in the dye molecule so that the bridging groups D and D' are in an ortho position relative to the bridging azo groups; Z and Z' are the same or different and each represent —O—, or —COO— which are disposed in an ortho position relative to the azo bridging groups; D and D' are the same or different and each represent —O—, —NH— or N—alkyl;

M represents chromium or cobalt; [N]$^+$ represents aliphatic ammonium or acyclic ammonium, [Q]$^+$ represents hydrogen, sodium, ammonium, aliphatic ammonium or acyclic ammonium, N'$^+$ represents aliphatic ammonium or acyclic ammonium, and $n$ represents an integer from 1–6.

10 Claims, No Drawings

PROCESS FOR PREPARING COLORED SYNTHETIC LEATHER

CROSS-REFERENCE TO RELATED APPLICATIONS

This application is a continuation-in-part of application Ser. No. 376,387, filed July 5, 1973 now abandoned.

BACKGROUND OF THE INVENTION

1. Field of the Invention

This invention relates to a process for preparing a colored polyurethane synthetic leather.

2. Description of the Prior Art

Various pigments or dyes have been used to color synthetic polyurethane leather. However, the use of pigments have produced a number of disadvantages. Pigments generally do not contain solubilizing groups, so often large particles of the pigments will form secondary and tertiary particle aggregations during product production. This particle aggregation is particularly prominent in the drying step. Usually, it is difficult to reduce the aggregated particles to a primary particle size by simple mechanical crushing. Because of these difficulties, polyurethane leathers dyed with conventional pigments often easily lose their color or result in dark, unsuitable colors. Even if these disadvantages are overcome such as by addition of dispersing agents into the pigments, the water and oil resistance of the synthetic leather product will be decreased which results in dissolution bleeding or color migration of the coloring agent. These factors adversely affect product quality.

Dyes, on the other hand, usually have solubilizing groups within the molecule which facilitates dispersion of the dye in oil or water. However, dyes have the disadvantage in that they impart low weather durability, water resistance, oil resistance, and bleeding resistance to the leather. For these reasons, no completely satisfactory method has been developed for the coloring of synthetic leather products. Conventional practice has called for the use of overcoats of nylon or polyurethane on top of the colored urethane leather to prevent bleeding of the coloring agent. To further complicate matters, satisfactory top coats have not been developed. In spite of these disadvantages, dyes still are the most prominent coloring agents used for synthetic polyurethane leather products because of their excellent clear hue and transparency and because of the variety of colors available.

A need continues to exist, however, for new techniques of coloring synthetic leathers which have good solubility, dispersibility, water resistance, oil resistance and weather durability and which have a very clear hue which will not bleed from the leather.

SUMMARY OF THE INVENTION

Accordingly, one object of the invention is to provide a process for preparing colored synthetic leather having excellent weather durability, water and oil resistance, and bleeding resistance, while having a clear hue.

Another object of the invention is to provide a process for preparing colored synthetic polyurethane leather wherein the dye is bonded to the polymer matrix of the leather.

Briefly, these objects and other objects of this invention as hereinafter will become readily apparent can be attained by a process for preparing colored synthetic polyurethane leather in whih the synthetic leather substrate is reacted with a 2:1 complex metal dye which contains isocyanate reactive groups such as amino groups, alkylamino groups or hydroxyl groups and which has the formula

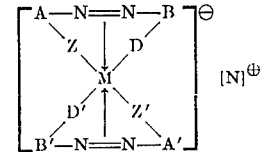

(1)

or

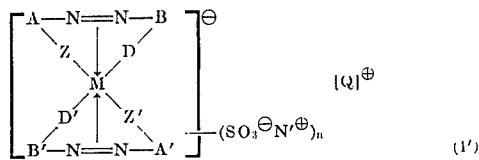

(1')

wherein A and A' are the same or different and each represent phenylene which can have a non-dissociated substituent; B and B' can be the same or different, and each represent coupling components which can contain non-dissociated substituents within each component, and are disposed so that the bridging groups D and D' are in an ortho position relative to the bridging azo groups; Z and Z' can be the same or different and each represent —O— or —COO— which are disposed in an ortho position relative to the azo bridging groups; D and D' can be the same or different and each represent —O—, —NH—, or —N-alkyl; M represents chromium or cobalt; [N]⁺ represents aliphatic ammonium or acyclic ammonium; [Q]⁺ represents hydrogen, sodium, ammonium, aliphatic ammonium or acyclic ammonium; N'⁺ represents aliphatic ammonium or acyclic ammonium; and n represents an integer from 1–6. The alkyl group is preferably a lower alkyl group having 1–15 carbon atoms.

DESCRIPTION OF THE PREFERRED EMBODIMENTS

In the preparation of the dyed synthetic leather products of this invention an isocyanate reactive group such as amino, alkylamino or hydroxyl of a 2:1 complex metal dye reacts with the free polyisocyanate components of the polyurethane substrate. Any one of several procedures is suitable for the reaction between the complex dye and the isocyanate component of the polyurethane substrate. By the phrase "alkylamino group" of course is intended to include the substituted alkylamino groups of substituents which do not interfere with the reactions. The phrase "hydroxyl" is used in the restrictive sense as meaning alcoholic hydroxyl. In one method the reactive complex dye is mixed with a polyisocyanate, a polyol and a solvent and the resulting solution can be coated onto a substrate such as a film, sheet, plate, or the like. The polyurethane is formed by the reaction of the polyisocyanate and polyol components. In another method the reactive complex dye is mixed with a polyisocyanate, a polyurethane and a solvent and the resulting solution is coated on a substrate. Still another method involves mixing the reactive complex dye with a polyurethane and a solvent and the resulting solution is coated on a substrate. To the coated mixture is added a solution of a polyisocyanate or a mixture of a polyisocyanate and a polyurethane in a solvent, wherein the polyisocyanate component is reacted with the reactive complex dye.

The polyisocyanates which are used in this invention to form the synthetic polyurethane leather substrate include aromatic isocyanates, aliphatic isocyanates and multi-functional compounds derived from isocyanate. Suitable aromatic isocyanates include 2,4-tolylene diisocyanate, 2,6-tolylene diisocyanate, 1,5-naphthalene diisocyanate, cumene-2,4-diisocyanate, 4-methoxy-1,3-phenylene diisocyanate, 4-chloro-1,3-phenylene diisocyanate, 4-ethoxy-1,3-phenylene diisocyanate, biphenylene-4,4'-diisocyanate, 3-nitro-biphenylene-4,4'-diisocyanate, 4,4'-methylene diphenyl diisocyanate, 3,3'-dimethyl-4,4'-methylene diphenyl diisocyanate, 3,3'-dimethyl-4,4'-diisocyanate diphenyl, 4,4'-diisocyanate diphenyl ether and triphenyl methane triisocyanate. Suitable aliphatic isocyanates include hexamethylene diisocyanate, tetramethylene diisocyanate, decamethylene diisocyanate, 1,4-cyclohexylene diisocyanate, 4,4'-methylene dicyclohexyldiisocyanate, p-xylene diisocyanate, and 1,4-phenylene diethylenediisocyanate. The multifunctional compounds derived from the isocyanate include the isocyanates

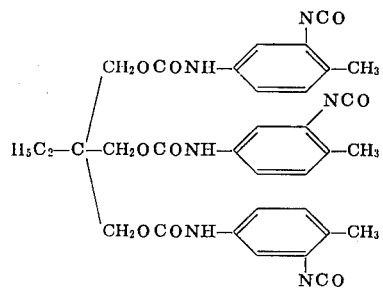

and

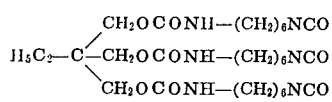

which are prepared by reacting 2,4-tolylene diisocyanate or hexamethylene diisocyanate with trimethylol propane.

The polyols which are reacted with the various isocyanates of this invention to form the synthetic polyurethane leather substrates can be essentially linear hydroxyl terminated polyesters.

Representative of these polyester diols are those obtained by esterification of aliphatic dibasic acids or anhydrides thereof with glycols. Preferably, in the synthesis of the polyesters the glycol component is employed in excess of the stoichiometric amount required to react with the acid or anhydride in order to ensure that the polyesters are hydroxyl-terminated. Suitable dicarboxylic acids (or anhydrides) employed in the preparation of the polyester diols include adipic, succinic, pimelic, suberic, azelaic, sebacic, terephthalic acids and mixtures thereof, or their anhydrides Adipic acid is the preferred acid. Suitable glycols employed in the preparation of the polyester diols are the straight chain aliphatic glycols containing from 2 to 10 carbon atoms, and include ethylene glycol, propane-1,3-diol, butane-1,4-diol, 2-butene-1,4-diol, hexane-1,6-diol, octane-1,8-diol, and decane-1,10-diol, and mixtures of two or more glycols. A preferred group of polyester diols is that which is obtained by esterifying adipic acid with an excess of a mixture of 9 parts ethylene glycol and 1 part of propane-1,2-diol.

The final dyed synthetic leather product can be obtained as shown in the equations (a)-(d). These equations demonstrate the manner in which the different types of isocyanates reactive groups which include the amino, alkylamino (including alkylamino) and hydroxyl (alcoholic) groups that are a part of the 2:1 complex metal dye (formula 1) react with the free isocyanate functional groups of the polyisocyanate components of the synthetic leather. By this mechanism the complex metal dyes are chemically bonded to the synthetic leather substrate through urea or urethane type bonds. The resulting leather products have the desired clear hue and do not bleed.

(a)
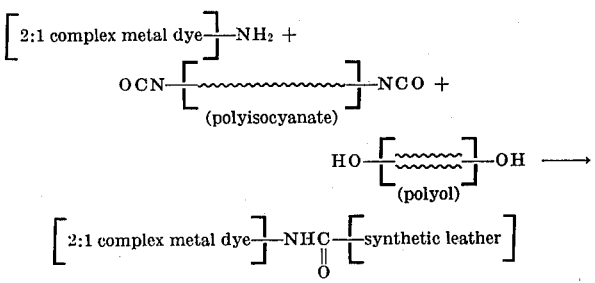

(b)
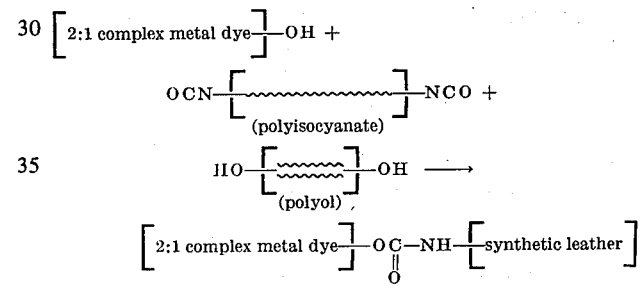

(c)
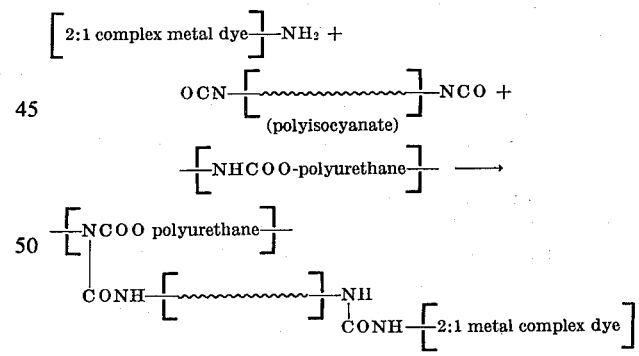

(d)
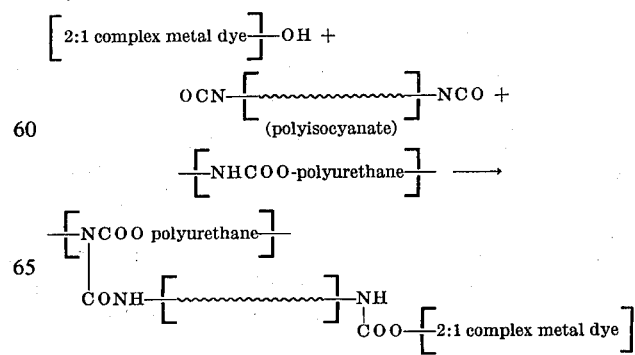

When the 2:1 complex metal dyes of formula (1') are used, the following reactions are representative of those which are believed to occur. As shown in the equations the complex dye is bonded to the polyurethane substrates through urea or urethane bonds.

(a')

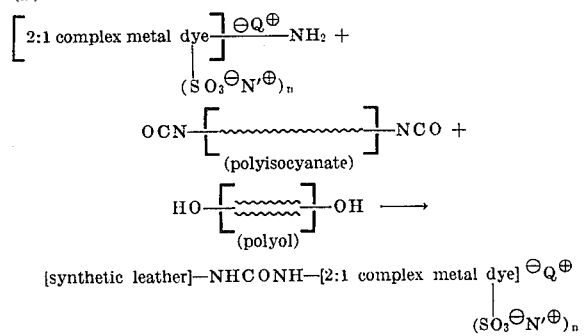

(b')

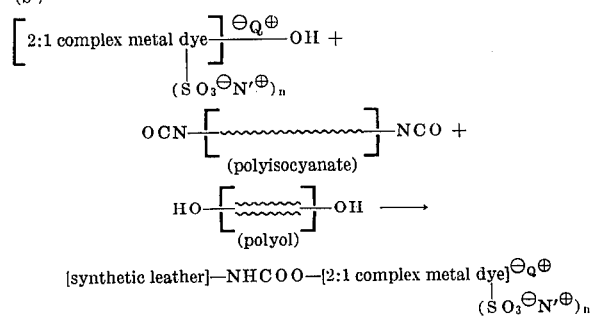

(c')

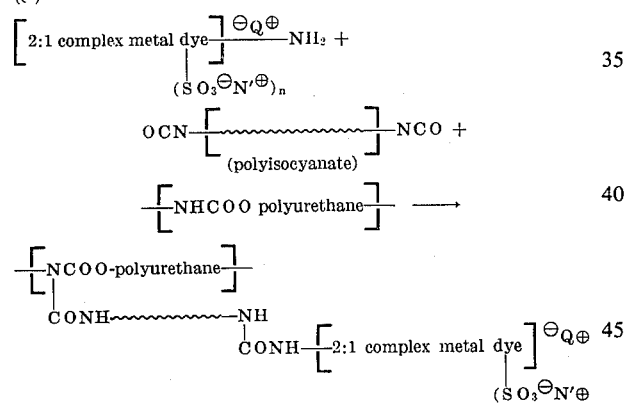

(d')

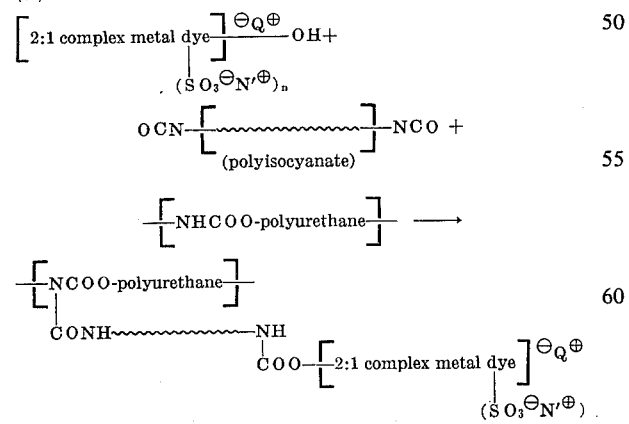

In all of the reactions which are used to form the dyed synthetic leather products of this invention, the polyisocyanates serve the dual function of supplying the groups which react with the coupling groups of the complex metal dyes and acting as a monomer with the polyol component to form the polyurethane substrate.

The amounts of the polyisocyanate, the polyol and the polyurethane which are used, and the solvent and reaction conditions are selected depending upon the type of synthetic leather required. As far as the manner in which the complex dye is reacted with the polyisocyanate component which in turn is reacted with the polyurethane or the polyol is concerned, any of the well known conventional procedures can be used for the formation of the synthetic polyurethane leather products. Therefore, a general discussion on the conventional procedures for forming the synthetic polyurethane leather products will not be presented.

The coloring process of this invention is completely different from the conventional methods of coloring synthetic polyurethane synthetic leather products. In the conventional coloring methods, a coloring agent which is a pigment or dye is simply dispersed or solubilized in the synthetic leather composition. However, in this invention, free isocyanate groups of the polyisocyanate components in the synthetic leather react with the complex metal dye through the amino, alkylamino or hydroxyl groups of the dye. By this mechanism the individual dye molecules are bonded to the synthetic leather substrate through covalent bonds. The bonding mechanism is not at all dissimilar to that which links a reactive dye to a substrate such as cotton or wool. This type of covalent bond substantially improves the washing fastness and rubbing fastness of the dyed fabric. Further, bleeding of the dyed substrates is substantially reduced.

In the process of this invention, the coloring agents or dyes having formulas (1) and (1') can be easily prepared by reacting a chromium or cobalt compound by conventional procedures, with a monoazo dye having the formula

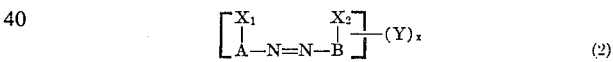

or

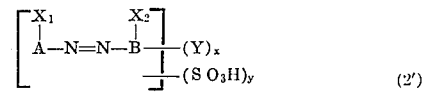

wherein A and B are as defined above; $X_1$ represents hydroxyl or carboxyl; $X_2$ represents hydroxyl, amino or lower alkylamino; Y represents the groups

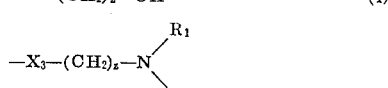

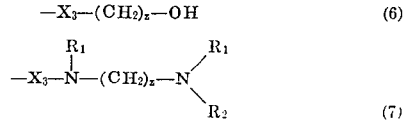

and

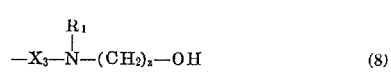

wherein $R_1$ and $R_2$ are hydrogen, lower alkyl, amino or hydroxy substituted lower alkyl, N-alkyl-amino or N-hydroxylalkylamino-substituted lower alkyl, $R_1$ and $R_2$ together may be a hetero six mimber ring containing an imino group, $X_3$ represents $-SO_2-$, $-NHSO_2-$, $-CO-$ or $-NHCO-$, z represents an integer from 1–4; Y can bond with A or B or both A and B; x represents 1 or 2 and y represents 1, 2 or 3.

The coloring agents or dyes having formula (1) or (1') are composed of a diazo constituent, a coupling constituent and a cationic constituent. The three constituents are individually listed in groups subsequently in the specification and are referred to by their component numerals. The following list shows typical diazo components with the appropriate component numeral which are useful in this invention.

| Component numeral | |
|---|---|
| (1) | 5-nitro-2-aminophenol |
| (2) | 4-nitro-2-aminophenol |
| (3) | 4-chloro-2-aminophenol |
| (4) | 4-methyl-2-aminophenol |
| (5) | 4-acetyl-2-aminophenol |
| (6) | 4-t-butyl-2-aminophenol |
| (7) | 2-aminophenol |
| (8) | 4-n-octyl-2-aminophenol |
| (9) | 4-methoxy-2-aminophenol |
| (10) | 4,6-dichloro-2-aminophenol |
| (11) | 4,6-dinitro-2-aminophenol |
| (12) | anthranilic acid |
| (13) | 2-amino-5-chlorobenzoic acid |
| (14) | 4,5-dimethyl-2-aminophenol |
| (15) | 4-nitro-6-chloro-2-aminophenol |
| (16) | 3,4,6-trichloro-2-aminophenol |
| (17) | 4-cyano-2-aminophenol |
| (18) | 4-hydroxymethyl-2-aminophenol |
| (19) | 4-($\beta$-hydroxyethyl sulfonyl)-2-aminophenol |
| (20) | 4-($\beta$-hydroxyethyl) aminoacetyl-2-aminophenol |
| (21) | 4-($\gamma$-hydroxypropionyl)-2-aminophenol |
| (22) | 3-amino-4-hydroxy-N-($\beta$-hydroxyethyl)-benzenesulfonamido |
| (23) | 2-amino-4-hydroxy-N-[$\beta$-(acetylamino)ethyl]-benzenesulfonamido |
| (24) | 4-acetylamino-2-aminophenol |
| (25) | 5-acetylamino-2-aminophenol |
| (26) | 4-{$\beta$-(acetylaminoethylsulfonyl)}-2-aminophenol |
| (27) | 4-{$\beta$-(N-acetyl-N-methyl) aminoethylsulfonyl} 2-aminophenol |
| (28) | 3-amino-4-hydroxy-N-{$\gamma$(acetylaminopropyl)}-benzenesulfonamide |
| (29) | 3-amino-4-hydroxy-N-{$\beta$-(N'-methyl-N'-acetyl) aminoethyl}-benzenesulfonamide |
| (30) | 3-amino-4-hydroxy-N-methyl-N-{$\beta$-(N'-methyl-N'-acetyl) aminoethyl}-benzenesulfonamide |
| (31) | 4-{$\gamma$-(acetylamino)propionyl}-2-aminophenol |
| (32) | 4-{$\gamma$-(N-methyl-N-acetyl) aminopropionyl}-2-aminophenol |
| (33) | 3-amino-4-hydroxy-5-{$\beta$-(N'-methyl-N'-acetyl) aminoethyl}-benzenecarboamide |
| (34) | 3-amino-4-hydroxy-N-{$\beta$-(N'-acetylaminoethyl}-benzenecarboamide |
| (35) | 3-amino-4-hydroxy-N-{$\beta$-(N'-ethyl-N'-acetyl) aminoethyl}-benzenecarboamide |
| (36) | 3-amino-4-hydroxy-N-{$\beta$-(N'-acetyl) aminopropyl}-benzenecarboamide |
| (37) | 3-amino-4-hydroxy-N-methyl-{$\beta$-(N'-methyl-N'-acetyl) aminoethyl}-benzenecarboamide |
| (38) | 3-amino-4-hydroxy-N-{$\beta$-(N'-acetyl) aminobutyl}-benzenecarboamide |
| (39) | 4-{$\gamma$-(N-acetyl-N-$\beta$-hydroxyethyl) aminopropionyl}-2-aminophenol |
| (40) | 4-[$\beta$-(acetylamino)acetyl]-2-aminophenol |
| (41) | 4-[$\beta$-(N-acetyl)-N-$\beta$'-hydroxyethyl)aminoethyl sulfonyl]-2-aminophenol |
| (42) | 5-nitro-2-aminophenol |
| (43) | 4-nitro-2-aminophenol |
| (44) | 4,6-dinitro-2-aminophenol |
| (45) | 4-nitro-6-chloro-2-aminophenol, and |
| (46) | 4-methyl-6-nitro-2-aminophenol |
| (47) | 4-sulfo-2-aminophenol |
| (48) | 5-sulfo-1-chloro-2-aminophenol |
| (49) | 5-sulfo-1-methyl-2-aminophenol |
| (50) | 4-(t-octyl)-2-aminophenol |
| (51) | 2-amino-5-sulfobenzoic acid |
| (52) | 4-hydroxy-3-amino-N-($\beta$-hydroxyethyl) benzenesulfonamide |
| (53) | N-(2,4-dihydroxybutyl)-3-amino-4-hydroxybenzenesulfonamide |
| (54) | 4-hydroxy-3-amino-N-($\beta$-acetylaminoethyl)-benzenesulfonamide |
| (55) | 6-nitro-4-sulfo-2-hydroxy-1-naphthylamine |

When the diazo components (24)–(41) and (54) are used, the acetamido group of the monoazo dye prepared with the diazo component is hydrolyzed or reduced to form a free amino or aklylamino group respectively. When the diazo components (42)–(46) and (55) are used, the nitro group of the monoazo dye prepared with the diazo component is reduced to an amino group.

The following list shows typical coupling components with the appropriate primed component numeral which are useful in this invention.

| Component numeral | |
|---|---|
| (1') | 1-amino-7-naphthol |
| (2') | 1-methylamino-7-naphthol |
| (3') | 1-($\beta$-aminoethylamino)-7-naphthol |
| (4') | 1-amino-6-naphthol |
| (5') | 1-dimethylamino-6-naphthol |
| (6') | 1-($\beta$-hydroxyethylsulfonyl)amino-6-naphthol |
| (7') | 2-hydroxy-6-{N-($\gamma$-aminopropyl)}-naphthalene sulfonamide |
| (8') | 6-($\beta'$-aminoethyl)sulfonyl-$\beta$-naphthol |
| (9') | 6-($\gamma$-aminopropyl)sulfonyl-$\beta$-naphthol |
| (10') | 6-hydroxy-2-{N-($\beta$-amihoethyl}-naphthoic amide |
| (11') | 6-($\beta'$-aminoacetyl)-$\beta$-naphthol |
| (12') | 2-hydroxy-6-{N-($\beta$-methylaminoethyl)}-naphthalenesulfonamide |
| (13') | 1-{N-($\beta$-aminoacetylamino)}-7-naphthol |
| (14') | 3-methoxy-$\beta$-naphthol |
| (15') | 1-aminoacetylamino-6-naphthol |
| (16') | 1-($\beta$-aminoethyl)aminosulfonyl-amino-6-naphthol |
| (17') | 1-piperazinoacetylamino-6-naphthol |
| (18') | 6-acetyl-$\beta$-naphthol |
| (19') | 6-t-butyl-$\beta$-naphthol |
| (20') | 4-ethoxy-1-naphthol |
| (21') | 6-bromo-$\beta$-naphthol |
| (22') | 6-($\beta'$-aminoethylcarbonyl)-$\beta$-naphthol |
| (23') | 4-amino-[N-($\beta$-aminoethyl)]-naphthalene sulfonamido |
| (24') | 1-(3'-methylaminophenyl)-3-methyl-5-pyrazolone |
| (25') | 1-(3'-ethylaminophenyl)-3-methyl-5-pyrazolone |
| (26') | 1-{3'-($\beta$-hydroxyethylamino) phenyl}-3-methyl-5-pyrazolone |
| (27') | 1-{4'-($\beta$-aminoacetyl) phenyl}-3-methyl-5-pyrazolone |
| (28') | 1-(4'-methylaminophenyl)-3-methyl-5-pyrazolone |
| (29') | 1-(4'-aminophenyl)-3-methyl-5-pyrazolone |
| (30') | 1-{3'-($\beta$-methylaminoethylamino) phenyl}-3-methyl-5-pyrazolone |
| (31') | 1-{4'-($\beta$-aminoethylsulfonyl) phenyl}-3-methyl-5-pyrazolone |
| (32') | 1-{4'-($\beta$-methylaminoethylsulfonyl) phenyl}-3-methyl-5-pyrazolone |
| (33') | 1-{4'-(N-$\beta$-aminoethylcarbamoyl) phenyl}-3-methyl-5-pyrazolone |
| (34') | 1-phenyl-3-amino-5-pyrazolone |
| (35') | 1-(3'-aminophenyl)-3-amino-5-pyrazolone |
| (36') | 1-(3'-chlorophenyl)-3-methyl-5-pyrazolone |
| (37') | 1-(2'-ethylphenyl)-3-methyl-5-pyrazolone |
| (38') | 1-(4'-methylphenyl)-3-methyl-5-pyrazolone |
| (39') | 1-phenyl-3-methyl-5-pyrazolone |
| (40') | 1-{4'-($\beta$-aminoethylamino) phenyl}-3-methyl-5-pyrazolone |
| (41') | 3-methyl-5-pyrazolone |
| (42') | 3-aminoacetoacetic anilide |
| (43') | 3-($\beta$-aminoethylamino) acetoacetic anilide |
| (44') | 3-methylaminoacetoacetic anilide |
| (45') | 3-($\beta$-aminoethylcarbamoyl) acetoacetic anilide |
| (46') | 4-methylacetoacetic anilide |
| (47') | N-acetoacetylbenzylamine |
| (48') | 4-($\beta$-methylaminoethylaminosulfonyl) acetoacetic anilide |
| (49') | 4-($\beta$-aminoethyl aminosulfonyl) acetoacetic anilide |
| (50') | N-acetoacetyl hexylamine |
| (51') | 3-($\beta$-aminopropionylamino)-4-methylphenol |
| (52') | N-ethyl-N-($\beta$-hydroxyethyl)-m-aminophenol |
| (53') | N-ethyl-N-($\beta$-methylaminoethyl)-m-aminophenol |
| (54') | N,N-bis-($\beta$-aminoethyl)-m-aminophenol |
| (55') | N,N-bis-($\beta$-hydroxyethyl)-m-aminophenol |
| (56') | N-($\beta$-hydroxyethyl)-N-($\beta$-aminoethyl)-m-aminophenol |
| (57') | N,N-bis-($\beta$-methylaminoethyl)-m-aminophenol |
| (58') | N-ethyl-N-($\beta$-aminoethyl)-m-aminophenol |
| (59') | 4-t-butylphenol |
| (60') | p-cresol |
| (61') | 3-methoxyphenol |
| (62') | 4-t-octylphenol |
| (63') | 1-(3'-aminophenyl) barbituric acid |
| (64') | 1-phenylbarbituric acid |
| (65') | N-(3-hydroxyphenyl) piperadine |
| (66') | 3-hydroxynaphthoic acid-(2)-(3-aminoanilide) |
| (67') | 3-hydroxynaphthoic acid-(2)-ethyl ester |
| (68') | 3-($\beta$-aminopropionylamino)-4-methylphenol |
| (69') | N-butyl-N-$\beta$-hydroxyethyl-m-aminophenol |
| (70') | N-butyl-N'-(3'-hydroxyphenyl)taurine |
| (71') | N,N-di($\beta$-aminoethyl)-m-aminophenol |
| (72') | N-$\beta$-hydroxyethyl-N-(3'-hydroxyphenyl) taurine |
| (73') | N-(3'-hydroxyphenyl)-N-($\beta$-aminoethyl) taurine |

| Component numeral | |
|---|---|
| (74') | N-(β-hydroxyethyl)-N-methyl-m-aminophenol |
| (75') | 2-amino-8-naphthol-6-sulfonic acid |
| (76') | 2-naphthol-6-sulfonic acid |
| (77') | N-methyl-2-naphthylamine-6-sulfonic acid |
| (78') | 2-amino-5-naphthol-7-sulfonic acid |
| (79') | 6-sulfo-2-naphthylamine |
| (80') | 6,8-disulfo-2-naphthol |
| (81') | 2-(β-aminoethylsulfonyl)amino-5-naphthol-7-sulfonic acid |
| (82') | 3,6-bis(β-hydroxyethylaminosulfonyl)-2-naphthol |
| (83') | 2-(β-hydroxyethylaminoethyl)amino-8-naphthol-6-sulfonic acid |
| (84') | 2-(aminoacetylamino)-5-naphthol-7-sulfonic acid |
| (85') | 2-naphthol-3,6-disulfonic acid |
| (86') | N,N-di(β-hydroxy)ethyl-2-hydroxynaphthalene-6-sulfonamide |
| (87') | 1-(2',5'-disulfonyl)-3-methyl-5-pyrazolone |
| (88') | 1-(3'-aminophenyl)-3-methyl-5-pyrazolone |
| (89') | 1-(2'-chloro-5'-sulfophenyl)-3-methyl-5-pyrazolone |
| (90') | 1-(3'-sulfo-6'-chlorophenyl)-3-methyl-5-pyrazolone |
| (91') | 2-hydroxy-6-(N-β-aminoethyl)-naphthalenesulfonamide |
| (92') | N-(4'-sulfophenyl)-acetoacetylamine |
| (93') | N-[3'-(β-methylaminoethylamino) phenyl] acetoacetylamine |
| (94') | N-(3'-aminophenyl)-2-hydroxy-3-naphthoic amide |

The following list shows typical cations with the appropriate component numeral which are useful in this invention.

| Component numeral | |
|---|---|
| (1") | sodium |
| (2") | potassium |
| (3") | ammonium |
| (4") | n-octylammonium |
| (5") | monomethylaminopropylammonium |
| (6") | monoethylaminobutylammonium |
| (7") | 2-ethylbutylammonium |
| (8") | 3-methoxypropylammonium |
| (9") | dibutylaminopropylammonium |
| (10") | monobutylaminobutylammonium |
| (11") | aminopropylethanolammonium |
| (12") | diethylaminopropylammonium |
| (13") | methyliminobispropylammonium |
| (14") | dimethylaminopropylammonium |
| (15") | diammonium ion of 1,2-diaminopropane |
| (16") | diammonium ion of 1,3-dimethylaminopropane |
| (17") | 2-ethylhexylammonium |
| (18") | monoethylaminopropylammonium |
| (19") | tetradecylammonium |
| (20") | N-aminopropyl-2-pipecolinium |
| (21") | piperazinium |
| (22") | piperidinium |
| (23") | hydrogen ion |
| (24") | N,N-dibutyl-propylammonium |
| (25") | stearylammonium |

In a preferred embodiment of the process of the invention, one or more of the dyes of formula [1] or [1'] is dissolved in a solvent which is inert to the polyisocyanate constituent such as methylethyl ketone, ethylacetate, tetrahydrofuran, toluene, dimethylformamide, or the like and a polyisocyanate component and a polyol component are added to the mixture. The mixture is blended and coated uniformly on a substrate and is reacted at 50°–80°C for 4 hours. By this procedure suitable synthetic leather products are obtained which have a clear hue and which do not bleed. Suitable substrates include cloth, non-woven fabrics, polyvinylchloride sheets, polyurethane sheets and nylon sheets.

Having generally described this invention, a further understanding can be obtained by reference to certain specific examples which are provided herein for purpose of illustration only and are not intended to be limiting unless otherwise specified. In the Examples, the terms part and percent mean part by weight and percent by weight respectively. Each product prepared in the Examples was tested by the following tests.

Bleeding test:

A 5×5 cm colored synthetic leather is covered with a polyvinylchloride sheet and a 1 kg of weight is placed on the sheet at 80°C for 5 hours. The amount of coloring in the polyvinyl chloride caused by bleeding of the dye from the leather is observed.

Water bleeding test:

A 5×5 cm colored synthetic leather is covered with a wet, white silk cloth and a 1 kg of weight is placed on the cloth at 25°C for 5 hours. The amount of coloring in the silk cloth caused by bleeding of the dye from the leather is observed.

The polyurethane materials which are used in the Examples are Nippolane 5121, a polyurethane prepared by reacting diphenylmethanediisocyanate with polybutyleneadipate and Nippolane 5034, a polyol prepared by reacting tolylenediisocyanate with the adipic acid coester of ethyleneglycol and diethyleneglycol.

EXAMPLE 1-a 4-n-octyl-2-amino phenol was diazotized and coupled with 1-amino-6-naphthol. The resulting monoazo dye was treated with a chromium compound by a conventional process to yield a 2:1 complex chromium dye having the formula

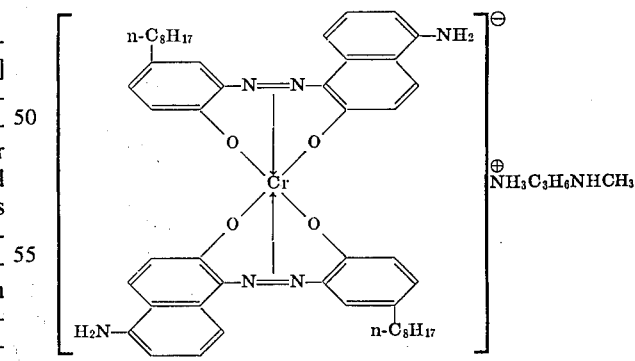

1 Part of the complex dye obtained was dissolved in 20 parts of dimethylformamide and 1.2 parts of a polyisocyanate (urethane triisocyanate prepared by reacting 1 mole of trimethylolpropane with 3 moles of 2,4-tolylenediisocyanate with a purity of 74.6% in 25.4% ethyl acetate-Colonate L manufactured by Nippon Polyurethane Ind., Co.), 20 parts of 45 percent polyol dissolved in 33 percent toluene and 22 percent ethylacetate (Nippolane 5034 manufactured by Nippon Polyurethane Ind., Co.) were added to the solution of the dye to form a uniform solution. The urethane composition solution containing the complex dye was coated on a polyvinyl sheet and dried at 80°C for 4 hours and a blue colored synthetic leather was obtained. The resulting synthetic leather was compared to a colored synthetic leather prepared by the same process except that a similar 2:1 complex chromium dye having the following formula which had no amino group was used.

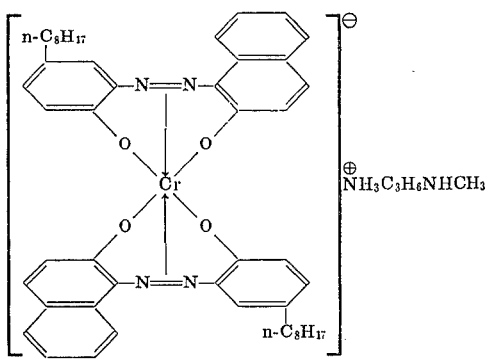

A comparison of the bleeding properties of the two synthetic leathers prepared showed that the bleeding properties of the product of this invention was substantially better than the comparitve product. No visible bleeding was found on the polyvinyl chloride sheet in the bleeding test when the complex dye of this invention was used. When the comparative complex dye which contained no amino group was used, the polyvinyl chloride sheet used in the bleeding test assumed a dark blue color.

When the complex dye of this invention was substituted with a methylamino group or a β-aminoethyl amino group, a blue colored synthetic leather which underwent no visible bleeding was obtained. When a polyurethane sheet was used instead of the polyvinylchloride sheet, similar results were obtained.

EXAMPLE 1-b 0.5 Part of the complex dye of Example 1-a was dissolved in 10 parts of dimethylformamide and 10 parts of a solution of a polyurethane (Nippolane 5121 manufactured by Nippon Polyurethane Ind. Co.) was added to form a uniform solution. The polyurethane solution containing the complex dye was coated on a polyvinylchloride sheet and dried at 110°C for 5 minutes. The colored synthetic polyurethane leather was coated with a solution of 10 parts of said polyurethane solution, 0.6 parts of a polyisocyanate compound prepared by reacting 1 mole of trimethylolpropane with 3 moles of 2,4-tolylenediisocyanate (Colonate L) and 6 parts of ethylacetate. The coated synthetic leather was dried at 110°C for 5 minutes and a blue colored synthetic leather was obtained which did not bleed when subjected to either of the two tests.

On the other hand, when the polyisocyanate compound was omitted in the coating solution, bleeding of the complex dye from in the leather substrate was found. When the chromium 2:1 complex dye which had no amino group was used, bleeding of the complex dye from the substrate was found in both tests.

When a polyurethane sheet was substituted for the polyvinylchloride sheet as a substrate, similarly good results were obtained.

EXAMPLE 1-c 0.5 part of the complex dye of Example 1-a was dissolved in 10 parts of dimethylformamide and 10 parts of polyurethane (Nippolane 5121) was added to form a uniform solution. To the solution was added 0.6 parts of a polyisocyanate (urethanetriisocyanate prepared by reacting 1 mole of trimethylpropane with 3 mole of 2,4-tolylenediisocyanate) to form a polyurethane solution containing the coloring material. The resulting polyurethane solution was coated on a polyvinylchloride sheet and was cured at 50°C for 4 hours. A blue colored synthetic leather was obtained which did not bleed when subjected to either test.

EXAMPLE 2

4-Nitro-2-aminophenol was diazotized and was coupled with N,N-bis-(2-aminoethyl)-m-amino phenol. The resulting monoazo dye was treated with a chromium compound by a conventional procedure and a 2:1 complex chromium dye having the following formula was obtained.

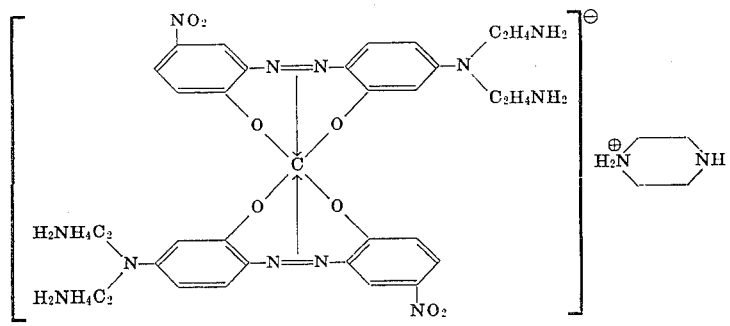

0.5 Part of the 2:1 complex chromium dye was dissolved in a solvent mixture of 10 parts of methylethyl ketone and 10 parts of ethyl acetate. 1.2 Parts of polyisocyanate (Colonate L) and 20 parts of polyol (Nippolane 5034) were added to the dye solution to form a uniform solution. The urethane composition solution containing the complex dye was uniformly coated on a polyurethane sheet and was dried at 50°C for 4 hours. A clear, red colored synthetic leather was obtained. The resulting synthetic leather was compared in the bleeding test to a colored synthetic leather prepared by the same process except that a similar 2:1 complex chromium dye having no amino group was used. The results showed a significant difference in the bleeding properties of the two samples, wherein no visible bleeding was found for the colored synthetic leather of this invention.

When 6-nylon sheet was used instead of the polyurethane sheet, similar results were obtained.

EXAMPLE 3

2-Amino-5-chloro benzoic acid was diazotized and coupled with 1-(3'-aminophenyl)barbituric acid to yield a monoazo dye. The monoazo dye was treated with a chromium compound by a conventional procedure and a 2:1 complex chromium dye having the following formula was obtained.

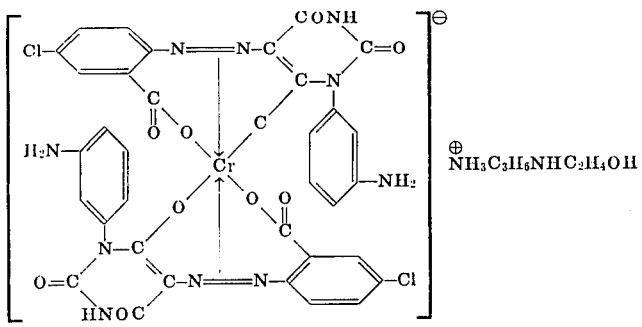

1 Part of the 2:1 complex chromium dye was reacted by the process of Example 1 and a yellow colored synthetic leather was obtained. The resulting synthetic leather was compared in the bleeding test to a colored synthetic leather prepared by the same process except that a similar 2:1 complex chromium dye having no amino group was used. The results showed a significant difference in the bleeding of the two dyed substrates wherein no visible bleeding was found for the colored synthetic leather of this invention.

EXAMPLE 4

3-Amino-4-hydroxy-N-($\beta$-hydroxyethyl)-benzenesulfonamide was diazotized and coupled with 6-t-butyl-$\beta$-naphthol. The resulting monoazo dye was treated with a chromium compound by a conventional procedure and a 2:1 complex chromium dye having the following formula was obtained.

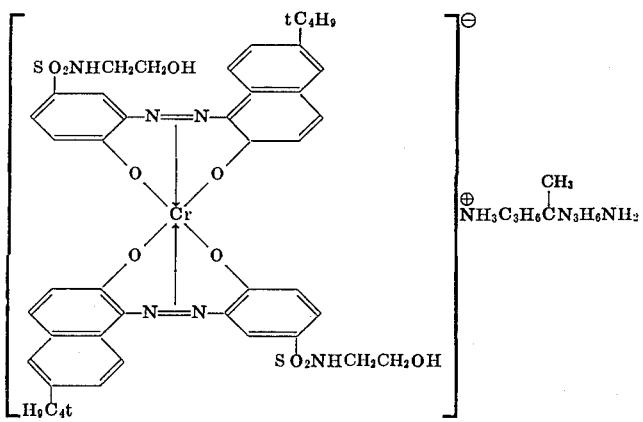

0.8 Part of the 2:1 complex chromium dye was dissolved in a solvent mixture of 15 parts of methylethyl ketone and 5 parts of ethylacetate and was reacted by the process of Example 1. A clear blue colored synthetic leather was obtained.

The resulting synthetic leather was compared in the bleeding test to a colored synthetic leather prepared by the same process except that a similar 2:1 complex chromium dye having no N-$\beta$-oxyethyl group was used. The test results showed a substantial difference between the two substrates wherein no visible bleeding was found for the colored synthetic leather of this invention.

EXAMPLE 5

4-Methyl-2-aminophenol was diazotized and coupled with 4($\beta$-aminoethylaminosulfonyl)-acetoacetic anilide to yield a monoazo dye. 3-Amino-4-hydroxy-N-($\beta$-hydroxyethyl)-benzene sulfonamide was diazotized and coupled with 4-methylacetoacetic anilide to yield a monoazo dye. The two types of monoazo dyes were treated with a cobalt compound by a conventional procedure and an asymmetrical 2:1 complex cobalt dye having the following formula was obtained.

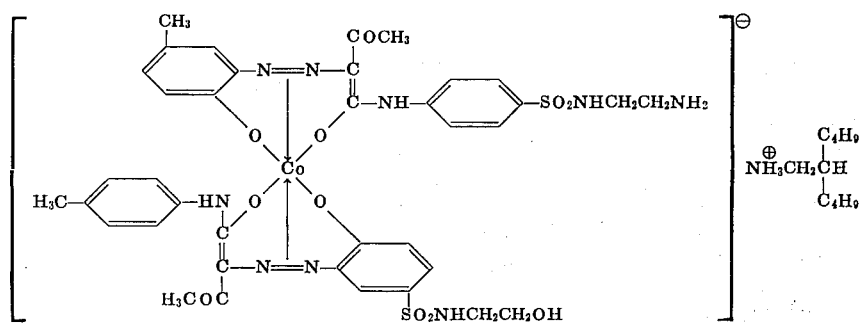

0.8 Part of the asymmetrical 2:1 complex cobalt dye was dissolved in a solvent mixture of 10 parts of methyethylketone and 10 parts of ethylacetate and was reacted by the process of Example 1 and a clear, yellowish-pink colored synthetic leather was obtained. The resulting synthetic leather was compared in a bleeding test to a colored synthetic leather prepared by the same process except that a similar 2:1 complex cobalt dye having no ethylamino group and no methylamino group was used. The test results showed a significant difference between the two products wherein no visible bleeding was found for the colored synthetic leather of this invention.

EXAMPLES 6 TO 36

In accordance with the process of Example 1, colored synthetic polyurethane synthetic leather products were prepared by reacting the leather products with 2:1 complex dyes prepared by treating a series of monoazo dyes with a chromium compound or a cobalt compound. The monoazo dyes are described in Table I by the diazo component numerals, the coupling component numerals and the cation component numerals shown. No visible bleeding was found for any of the resulting clear, colored synthetic leather products obtained. The colors of the synthetic leathers are also shown in the Table.

treated with isooctylamine. A 2:1 complex chromium dye having the following formula was obtained.

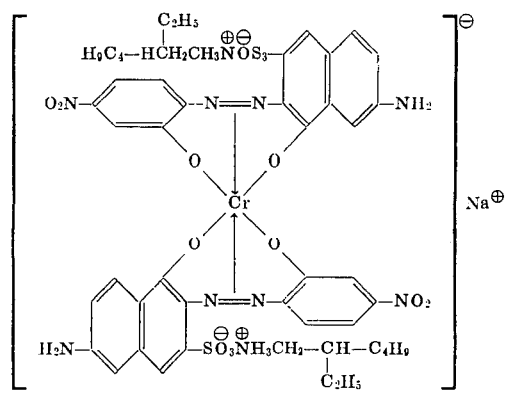

1 Part of the complex dye was dissolved in a solvent mixture of 10 parts of methylethylketone and 10 parts of dimethylformamide. 1.2 Parts of a polyisocyanate (Colonate L) and 20 parts of a polyol (Nippolane 5034) were added to the solution to form a uniform solution. The urethane composition solution containing the complex dye was coated on a polyvinylchloride sheet and dried at 80°C for 4 hours. A blueish black colored synthetic polyurethane leather product was obtained. No bleeding of the dye from the synthetic

TABLE I

| Example | Monoazo dye diazo component | coupling component | Metal | Cation [N]+ | Type of complex dye | Color |
|---|---|---|---|---|---|---|
| 6 | (7) | (8') | Cr | (4'') | symmetric | violet |
| 7 | (9) | (11') | Cr | (6'') | asymmetric | bluish grey |
|  | (5) | (7') |  |  |  |  |
| 8 | (14) | (28') | Cr | (7'') | symmetric | pinkish red |
| 9 | (11) | (24') | Cr | (20'') | " | red |
| 10 | (15) | (5') | Cr | (8'') | " | violet |
| 11 | (16) | (12') | Cr | (7'') | " | blue |
| 12 | (34) | (62') | Cr | (9'') | " | yellowish red |
| 13 | (35) | (30') | Cr | (10'') | " | yellowish pink |
| 14 | (37) | (31') | Cr | (4'') | asymmetric | pinkish brown |
|  | (38) | (32') |  |  |  |  |
| 15 | (2) | (54') | Cr | (21'') | symmetric | red |
| 16 | (14) | (45') | Co | (5'') | " | yellow |
| 17 | (23) | (50') | Cr | (12'') | " | yellow |
| 18 | (18) | (23') | Cr | (14'') | " | reddish blue |
| 19 | (19) | (55') | Cr | (23'') | " | red |
| 20 | (40) | (64') | Cr | (15'') | symmetric | greenish yellow |
| 21 | (6) | (33') | Cr | (22'') | " | pink |
| 22 | (1) | (40') | Cr | (7'') | asymmetric | pinkish red |
| 23 | (26) | (66') | Cr | (7'') | symmetric | reddish blue |
| 24 | (1) | (21') | Cr | (16'') | asymmetric | blue |
|  | (1) | (22') |  |  |  |  |
| 25 | (2) | (56') | Cr | (23'') | symmetric | red |
| 26 | (3) | (48') | Cr | (17'') | " | yellow |
| 27 | (21) | (59') | Cr | (4'') | asymmetric | brown |
|  | (21) | (60') |  |  |  |  |
| 28 | (29) | (18') | Cr | (5'') | symmetric | blue |
| 29 | (23) | (5') | Cr | (18'') | " | black |
| 30 | (18) | (61') | Co | (11'') | " | brown |
| 31 | (3) | (47') | Cr | (14'') | asymmetric | yellow |
|  | (3) | (12') |  |  |  |  |
| 32 | (1) | (12') | Cr | (5'') | symmetric | blue |
| 33 | (20) | (14') | Cr | (17'') | " | blue |
| 34 | (1) | (15') | Cr | (4'') | " | black |
| 35 | (2) | (16') | Cr | (1'') | " | black |
| 36 | (1) | (65') | Cr | (17'') | " | red |

In the following Examples, 2:1 complex chromium dyes are used which have at least one sulfo group.

EXAMPLE 37

5-Nitro-2-aminophenol was diazotized and coupled with 2-amino-8-naphthol-6-sulfonic acid (γ-acid). The resulting monoazo dye was treated with a chromium compound by a conventional procedure and was leather product was found.

EXAMPLE 38

4-Nitro-2-aminophenol was diazotized and coupled with 1-(2',5'-disulfophenyl)-3-methyl-5-pyrazolone. The resulting monoazo dye was reduced with sodium bisulfite and a dye having the following formula was obtained.

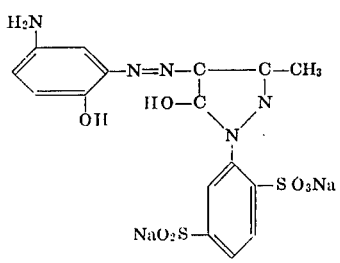

The dye was treated with a cobalt compound and further treated with N,N-dibutyl-propylamine. A 2:1 complex cobalt dye having the following formula was obtained.

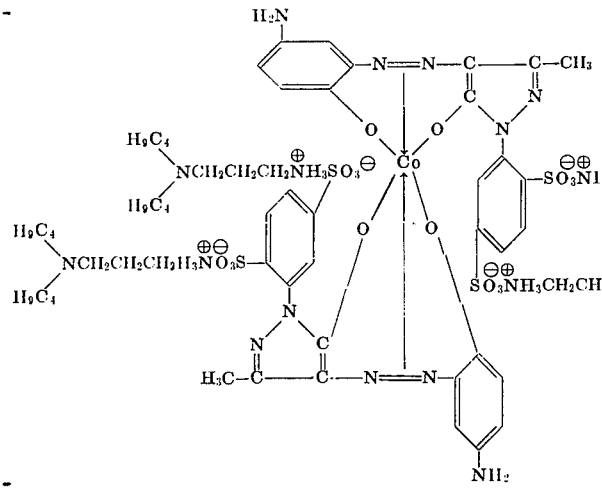

The process of Example 1 was followed except that 0.5 part of the complex dye was used and a clear, orange colored synthetic polyurethane synthetic leather product which did not bleed was obtained.

EXAMPLE 39

5-Nitro-2-aminophenol was diazotized and coupled with 2-hydroxy-6-(N-β-aminoethyl)-naphthalenesulfonamide to yield a monoazo dye. 4-Chloro-2-aminophenol was diazotized and coupled with 2-naphthol-6-sulfonic acid to yield a monoazo dye. Both of the monoazo dyes were treated with a chromium compound and an asymmetric 2:1 complex chromium dye was obtained which was treated with stearylamine to form a salt having the formula

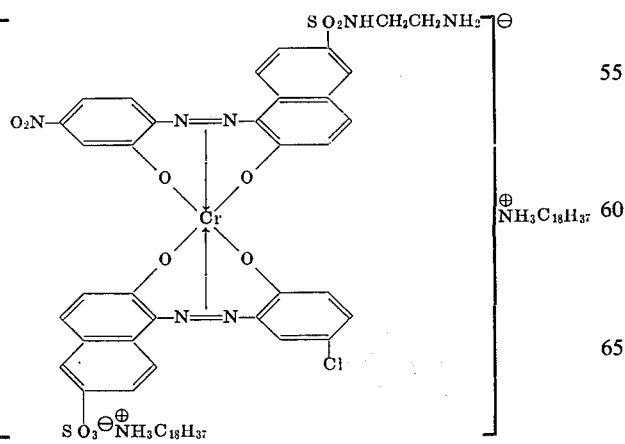

The process of Example 1 was followed except that 0.8 part of the complex dye was used and a clear, violet colored synthetic polyurethane leather was obtained which did not bleed.

EXAMPLE 40

The process of Example 1 was followed except that 0.6 part of the 2:1 complex chromium dye having the following formula was used (the salt was formed by treating the complex with isooctylamine). A clear, red colored synthetic polyurethane leather was obtained which did not bleed.

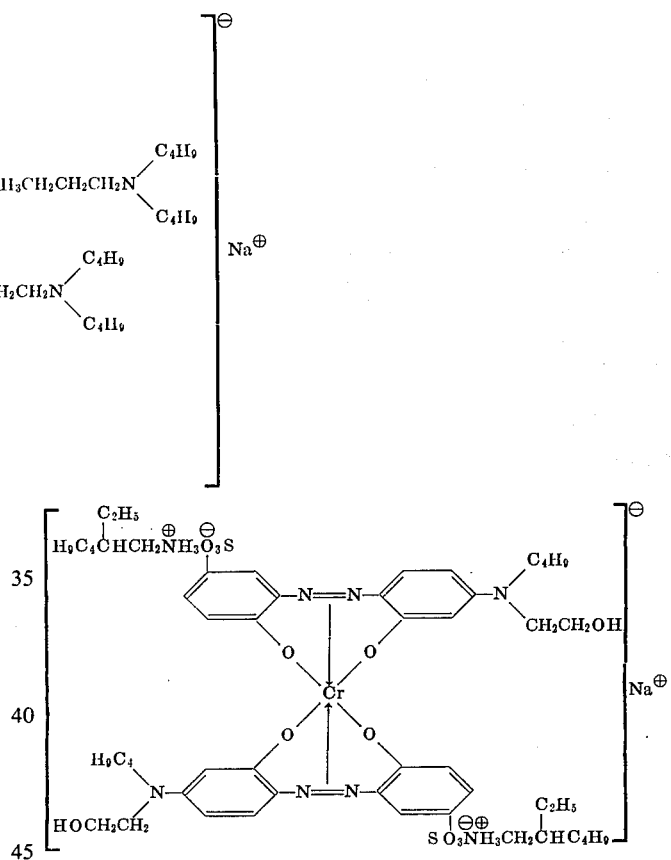

EXAMPLE 41

The process of Example 1 was followed except that 1 part of the 2:1 complex chromium dye having the following formula was used (the salt was formed by treating the complex with isooctylamine). A black, colored synthetic polyurethane leather was obtained which did not bleed.

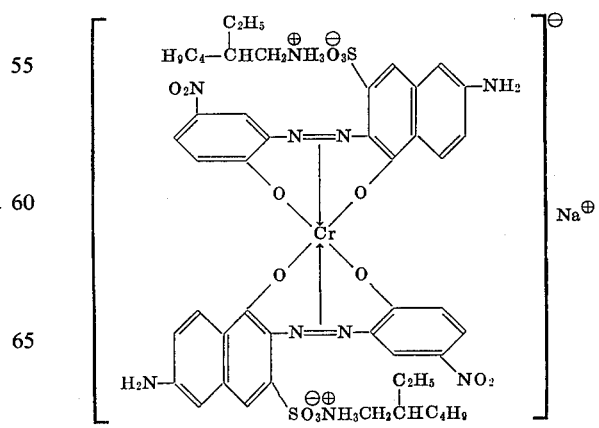

The various components which constitute the monoazo dyes of Examples 42–68 are shown in Table II below as well as the colors of the dyed synthetic leather products obtained.

TABLE II

| Example | Monoazo dye diazo component | coupling component | Metal | Cation [M⁺] N'⁺ | Type of complex dye | Color |
|---|---|---|---|---|---|---|
| 42 | (47) | (88') | Cr | (1")(4") | symmetric | reddish yellow |
| 43 | (48) | (91') | Cr | (23")(5") | " | violet-yellow |
| 44 | (18) | (92') | Co | (1")(10") | " | reddish yellow |
| 45 | (12) | (88') | Cr | (17")(17") | asymmetric | yellow |
|    | (12) | (87') |    |          |            |        |
| 46 | (54) | (70') | Cr | (1")(20") | symmetric | red-orange |
| 47 | (24) | (79') | Cr | (1")(8")  | " | violet-blue |
| 48 | (55) | (80') | Cr | (1")(17") | " | black |
| 49 | (19) | (81') | Co | (1")(17") | " | black |
| 50 | (49) | (27') | Cr | (1")(10") | " | reddish yellow |
| 51 | (50) | (75') | Cr | (3")(17")  | " | blue-black |
| 52 | (51) | (93') | Cr | (1")(4")   | " | yellow |
| 53 | (47) | (82') | Cr | (15")(15") | " | violet |
| 54 | (48) | (71') | Co | (1")(21")  | " | red |
| 55 | (19) | (72') | Cr | (1")(11")  | " | orange-red |
| 56 | (1)  | (19') | Cr | (1")(5")   | asymmetric | black |
|    | (19) | (83') |    |            |            |       |
| 57 | (31) | (89') | Cr | (1")(12")  | symmetric | red-orange |
| 58 | (51) | (63') | Cr | (1")(13")  | " | greenish yellow |
| 59 | (47) | (94') | Cr | (1")(14")  | " | violet-blue |
| 60 | (1)  | (84') | Cr | (1")(15")  | " | black |
| 61 | (48) | (65') | Co | (22")(22") | " | red |
| 62 | (48) | (73') | Cr | (1")(17")  | " | red |
| 63 | (52) | (79') | Cr | (1")(9")   | symmetric | violet-blue |
| 64 | (2)  | (85') | Cr | (1")(17")  | " | blue |
| 65 | (46) | (73') | Cr | (1")(1")   | " | red |
| 66 | (49) | (86') | Cr | (1")(16")  | " | blue |
| 67 | (53) | (90') | Cr | (1")(17")  | " | orange |
| 68 | (1)  | (74') |    |            |            |       |
|    | (47) | (57') | Cr | (1")(17")  | asymmetric | red |

Having now fully described this invention, it will be apparent to one of ordinary skill in the art that many changes and modifications can be made thereto without departing from the spirit or scope of the invention as set forth herein.

What is claimed as new and intended to be covered by Letters Patent is:

1. In a process for preparing a colored synthetic polyurethane leather by reacting a polyisocyanate with a polyol or a polyurethane, the improvement which comprises reacting the polyisocyanate with a 2:1 complex metal dye which contains an isocyanate-reactive group selected from the group consisting of amino, alkylamino, and hydroxyl and which has the formula,

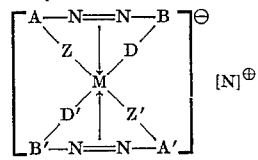

(1)

or

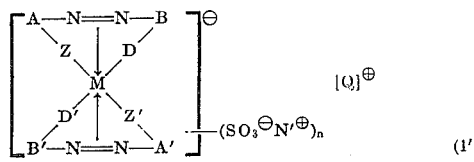

(1')

wherein A and A' are the same or different and each represent phenylene which can have non-dissociated substituents; B and B' are the same or different and each represent coupling components which can contain non-dissociated substituents within each component and are disposed in the dye molecule so that the bridging groups D and D' are in an ortho position relative to the bridging azo groups; Z and Z' are the same or different and each represent —O—, or —COO— which are disposed in an ortho position relative to the azo bridging groups; D and D' are the same or different and each represent —O—, —NH— or N—alkyl;
     |

M represents chromium or cobalt; [N] ⁺ represents aliphatic ammonium or acyclic ammonium; [Q]⁺ represents hydrogen, sodium, ammonium, aliphatic ammonium or acyclic ammonium; and N'⁺ represents aliphatic ammonium or acyclic ammonium; and n represents an integer from 1–6.

2. The process of claim 1, wherein the terminal hydroxyl froups of said 2:1 complex metal dye are reacted with said polyisocyanate component which has previously reacted with said polyol component or said polyurethane substrate.

3. The process of claim 1, wherein said 2:1 complex metal dye is mixed with said polyisocyanate component, said polyol component and a solvent and the resulting solution is coated on a substrate.

4. The process of claim 1, wherein said 2:1 complex metal dye is mixed with said polyisocyanate component, said polyurethane and a solvent and the resulting solution is coated on a substrate.

5. The process of claim 1, wherein said 2:1 complex metal dye is mixed with said polyurethane and a solvent and the resulting solution is coated on a substrate over which is applied a solution of said polyisocyanate component and said polyurethane.

6. The process of claim 1, wherein the amount of said polyisocyanate component added is more than the equivalent amount necessary to react with said 2:1 complex metal dye.

7. The process of claim 1, wherein said 2:1 complex metal dye is prepared by reacting a chromium or cobalt compound with a monoazo dye having the formula

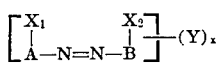 (2)

or

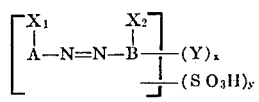 (2′)

wherein A and B are defined as above; $X_1$ represents hydroxyl or carboxyl; $X_2$ represents hydroxyl, amino, or a lower alkylamino; Y represents the groups $$-\mathrm{N} \begin{matrix} R_1 \\ R_2 \end{matrix} \quad (3)$$

$$-(CH_2)_z-OH \quad (4)$$

$$-X_3-(CH_2)_z-\mathrm{N} \begin{matrix} R_1 \\ R_2 \end{matrix} \quad (5)$$

$$-X_3-(CH_2)_z-OH \quad (6)$$

$$-X_3-\underset{R_1}{\mathrm{N}}-(CH_2)_z-\mathrm{N} \begin{matrix} R_1 \\ R_2 \end{matrix} \quad (7)$$

or $$-X_3-\underset{R_1}{\mathrm{N}}-(CH_2)_z-OH \quad (8)$$

wherein $R_1$ and $R_2$ are hydrogen, lower alkyl, amino or hydroxy substituted lower alkyl, N-alkyl-amino or N-hydroxylalkylamino-substituted lower alkyl; $R_1$ and be a 2 combined may be hetero six member ring containing an imino group; $X_3$ represents $-SO_2-$, $-NHSO_2-$, $-CO-$ or $-NHCO-$; z represents an integer from 1–4; Y may be bonded with A or B or both A and B; x represents 1 or 2 and y represents 1, 2 or 3.

8. A colored synthetic polyurethane leather which comprises the reaction product of a polyisocyanate with a polyol or a polyurethane substrate and a 2:1 complex metal dye which contains an isocyanate-reactive group selected from the group consisting of amino, alkylamino, and hydroxyl and which has the formula

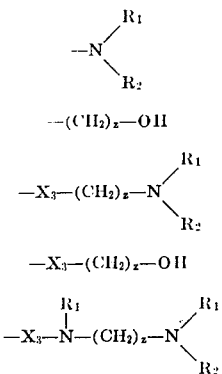

wherein A and A′ are the same or different and each represent phenylene which can have non-dissociated substituents; B and B′ are the same or different and each represent coupling components which can contain non-dissociated substituents within each component and are disposed in the dye molecule so that the bridging groups D and D′ are in an ortho position relative to the bridging azo groups; Z and Z′ are the same or different and each represent $-O-$, or $-COO-$ which are disposed in an ortho position relative to the azo bridging groups; D and D′ are the same or different and each represent $-O-$, $-NH-$, $$-NH- \text{ or } \underset{|}{N}-alkyl;$$

M represents chromium or cobalt; $[N]^+$ represents aliphatic ammonium or acyclic ammonium; $[Q]^+$ represents hydrogen, sodium, ammonium, aliphatic ammonium or an acyclic ammonium; $N'^+$ represents aliphatic ammonium or acyclic ammonium; and n represents an integer from 1–6.

9. The synthetic leather of claim 8 wherein the terminal hydroxyl groups of said 2:1 complex metal dye is reacted with said polyisocyanate component which has previously been reacted with said polyol or said polyurethane substrate.

10. The synthetic leather of claim 8, wherein said 2:1 complex metal dye is mixed with said polyisocyanate component, said polyol component and a solvent, and the resulting solution is coated onto a substrate.

* * * * *